United States Patent
Sinha et al.

(10) Patent No.: US 7,333,536 B2
(45) Date of Patent: Feb. 19, 2008

(54) SYSTEM AND METHOD FOR AUTO BAUD RATE DETECTION IN ASYNCHRONOUS SERIAL COMMUNICATION

(75) Inventors: Sangeeta Sinha, Noida (IN); Praveen Kumar, Delhi (IN)

(73) Assignee: StMicroelectronics Pvt. Ltd., Uttar Pradesh (IN)

( * ) Notice: Subject to any disclaimer, the term of this patent is extended or adjusted under 35 U.S.C. 154(b) by 770 days.

(21) Appl. No.: 10/683,887

(22) Filed: Oct. 9, 2003

(65) Prior Publication Data
US 2005/0078745 A1 Apr. 14, 2005

(51) Int. Cl.
*H04B 17/00* (2006.01)
(52) U.S. Cl. ...................................................... 375/225
(58) Field of Classification Search ................ 375/225, 375/220, 222, 370
See application file for complete search history.

(56) References Cited

U.S. PATENT DOCUMENTS

| | | | |
|---|---|---|---|
| 3,747,074 A | 7/1973 | Schulze | |
| 3,775,751 A * | 11/1973 | Anderson | 370/465 |
| 5,490,209 A | 2/1996 | Kennedy et al. | |
| 5,982,837 A * | 11/1999 | Earnest | 375/377 |
| 6,157,689 A * | 12/2000 | Petty et al. | 375/370 |
| 6,366,610 B1 | 4/2002 | Loyer et al. | |

\* cited by examiner

*Primary Examiner*—Kevin Kim
(74) *Attorney, Agent, or Firm*—Hogan & Hartson LLP

(57) ABSTRACT

A microcontroller with embedded software for automatically detecting a baud rate of an asynchronous serial bit stream during an initial set up phase of a microcontroller. The microcontroller is configured to receive a data set from a transmitter and includes a transition detector for identifying bit transitions in the data set. The microcontroller includes a timer triggered by the transition detector that is measures the time interval between two predefined bit transitions, a storage element for registering the measured time interval, and a look up table that provides defines baud rates relative to various time intervals that can be accessed to determine a nearest baud rate value corresponding to the registered time interval.

17 Claims, 4 Drawing Sheets

SYSTEM AND METHOD FOR AUTO BAUD RATE DETECTION IN ASYNCHRONOUS SERIAL COMMUNICATION

FIELD OF THE INVENTION

The invention relates to a system and method for auto detection baud rate in asynchronous serial communication.

BACKGROUND OF THE INVENTION

It is important to know exact operating baud rates to achieve successful asynchronous serial digital communication. Practically, however, it is not possible to know the baud rate of each transmitter. Therefore, to obtain effective communication, receivers are typically provided with baud rate detectors.

In general baud rates are detected by measuring the time period of either the start bit or the complete data frame. Extensive work has been carried out for automatic detection of baud rates during communication. However, this work has been aimed at providing a dedicated hardware solution rather than an on-chip or integrated solution.

U.S. Pat. No. 3,747,074 describes an exemplary baud rate detector. In the described detector, additional hardware is provided with integrated circuits to detect the communication baud rate. To determine the baud rate, a predetermined frame of data is transmitted through the transmitter. Time for each transition is recorded and an average of the total time taken and bits transmitted are used to determine the baud rate.

U.S. Pat. No. 5,490,209 describes another baud rate detector that operates to determine the highest operating baud rate. A highest possible baud rate is selected and then, a predetermined set of data frames is received from a transmitter. Further, the patent describes a communication method in which the baud rate is lowered in small steps until the data frames are received undistorted. U.S. Pat. No. 6,366,610 describes yet another baud rate detector that also utilizes additional hardware to determine baud rates.

There remains a need for an on-chip technique for detecting baud rate with accuracy.

SUMMARY OF THE INVENTION

The present invention provides a software-based or on-chip method of determining the baud rate of a bit stream, such as an asynchronous serial bit stream. In practice, the present invention is useful for allowing a microcontroller to automatically determine the baud rate of a received bit stream from a transmitter without the use of additional hardware, and then this determined baud rate is used in the initial set up phase to configure the microcontroller.

More particularly, the invention provides a microcomputer system for automatically detecting a baud rate of an asynchronous serial bit stream received from a transmitter during an initial start up phase. The system includes an interrupt generator triggered by two consecutive bit transitions in the received bit stream. A timer in the system is triggered by the interrupt generator to measure a time interval between the bit transitions. A look up table is provided in the system that defines baud rates for a set of time intervals and the table is accessible to allow comparison of the measured time interval to the set of time intervals to determine a nearest baud rate. The bit stream typically includes a known data set including a synchronizing character, such as the "ENTER" ASCII character. A predefined pair of bit transitions corresponding to the longest duration or largest time interval is used in some embodiments for the measured time interval to more accurately determine the baud rate. The start bit is often excluded by the system from the bit transitions to further enhance accuracy of the system.

BRIEF DESCRIPTION OF THE DRAWINGS

The invention will now be described with reference to the accompanying drawings.

DETAILED DESCRIPTION

Figure 1:
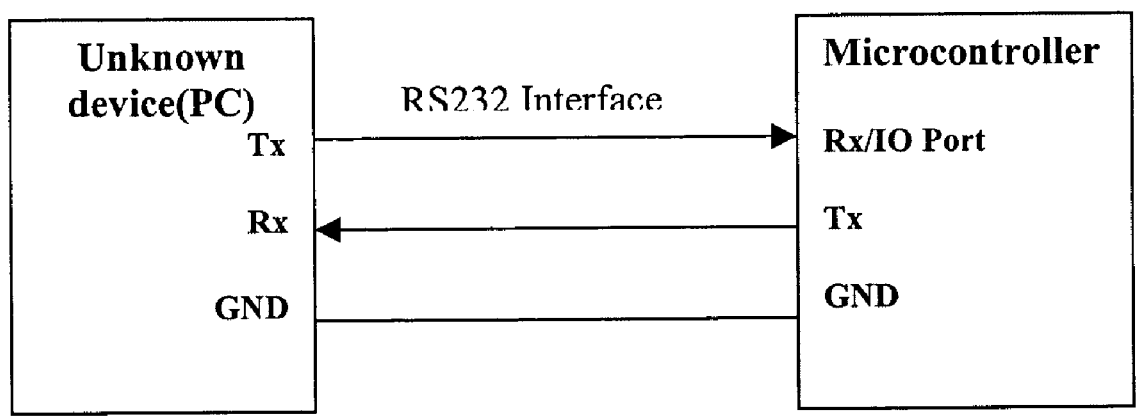
FIG. 1 shows a microcontroller interfaced with a transmitter for an asynchronous serial communication using an RS232 interface or other communications interface.

FIG. 1 shows a microcontroller interfaced with a transmitter for an asynchronous serial communication using an RS-232 Interface available from STMicroelectronics, Inc. as shown or other useful communication interface. The present invention provides a solution for performing automatic baud rate detection and for configuration of the asynchronous serial interface on a microcontroller. Hardware features of the microcontroller like general purpose Parallel I/O ports (PIO) and timer are used for baud rate detection. The I/O port has the capability of generating an interrupt when the input signal level differs from that defined in a compare register of the I/O port. The timer is a free running counter, which is used to measure time between two interrupts. This measured time is compared against a standard table to obtain the baud rate.

Figure 2:
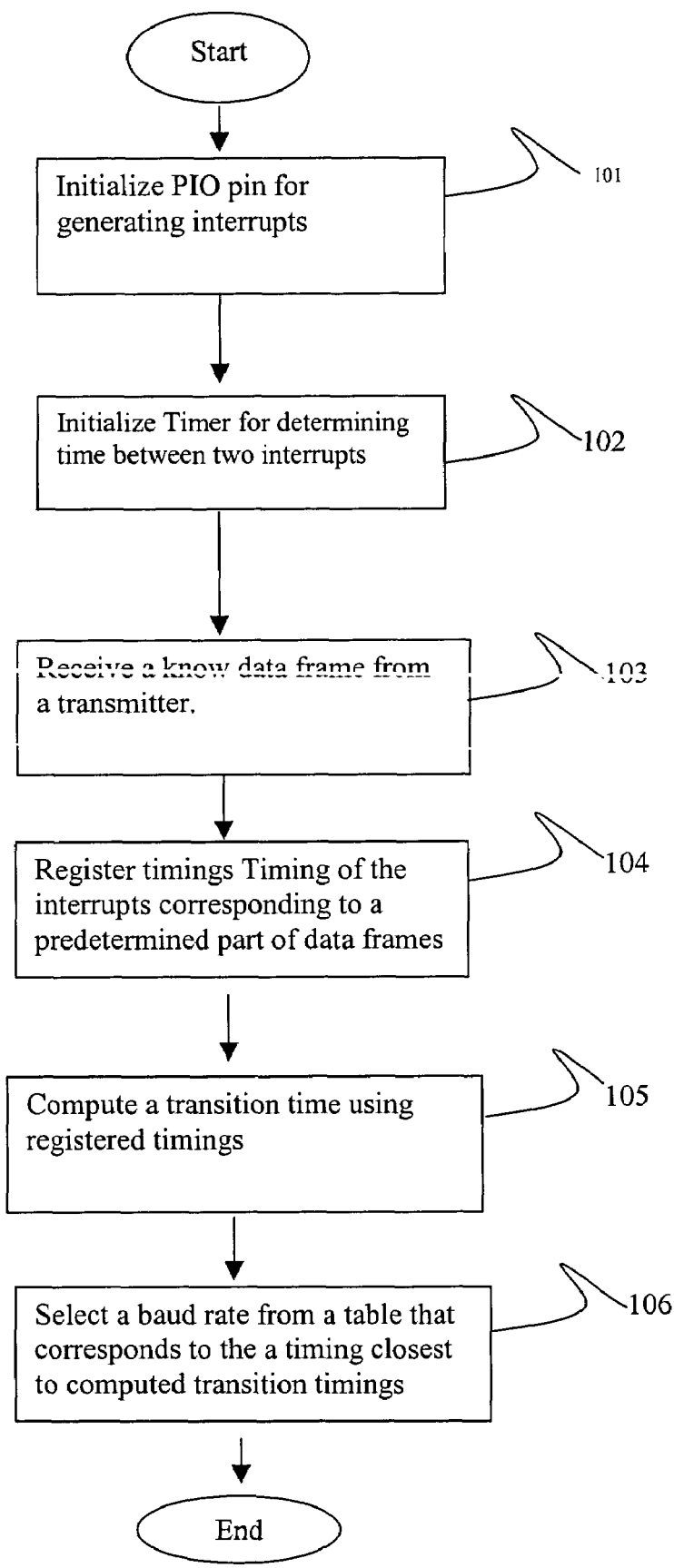
FIG. 2 shows an exemplary flow diagram of the embedded software.

The above process is implemented through embedded software rather than additional hardware. An exemplary flow diagram of the embedded software is shown in FIG. 2. In the first step 101, a PIO pin is configured for generating an interrupt for each transition that occurs. To achieve this function, the PIO is set in a compare mode in which the PIO generates an interrupt when the input signal differs from the specified value in a compare register. The compare register is set equal to logic "1". On every interrupt generation, the embedded software toggles the compare register's bit value. This results in generating edge triggered interrupts. In the second step 102, the timer counter is initialised to count the time between two interrupts. The microcontroller from the transmitter receives a predetermined data set or known data frame in step 103.

For the purpose of fully describing the invention but not as a limitation, an ASCII data frame corresponding to an "ENTER" signal or character of the ASCII code is transmitted in one embodiment by the unknown transmitter as a synchronizing character. In step 104, transition timings corresponding to a predetermined part of the data frame are detected to compute a time in which the predetermined part of the data frame is received. The predetermined part of the data frame has the largest duration between two transitions.

Figure 4:
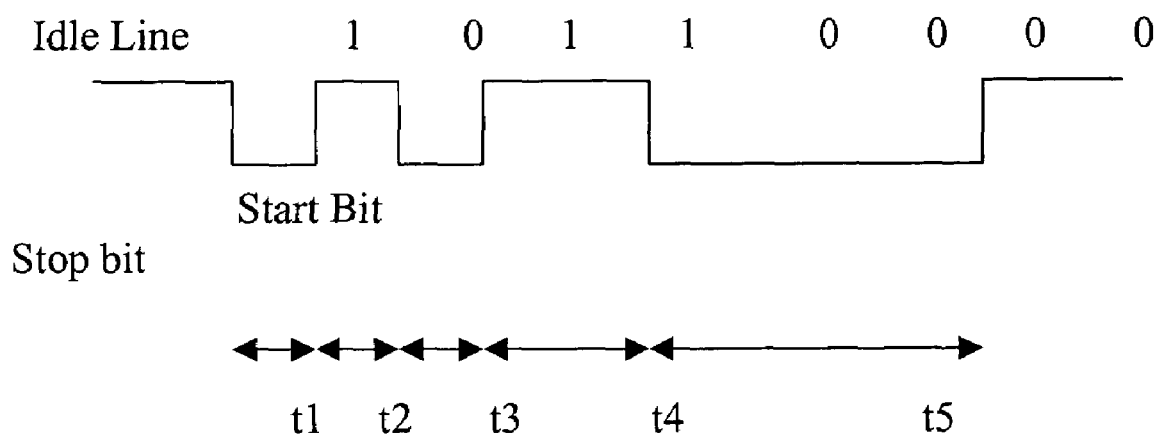
FIG. 4 illustrates a data frame with different transitions.

In one example, the largest duration is between the fourth and fifth transition when four consecutive bits are zero as shown in FIG. 4. Such selection of transition timings for determining baud rate allows reducing the errors that might result due to detection constraints of a single transition in a small period of time. Since the start bit of the data frame is more likely to be distorted, it is not being used for the purpose of time measurements, and hence, accuracy of measurement increases. Further, the selection of time is over a longest duration between two transitions. As a result, the errors occurring during individual transitions of bits do not affect the measurements, and this provides a more accurate measurement of time.

In step 105, a transition time is computed using two registered timings. In step 106, a baud rate corresponding to the time that is the closest computed time is selected to configure the microcontroller.

Figure 3:
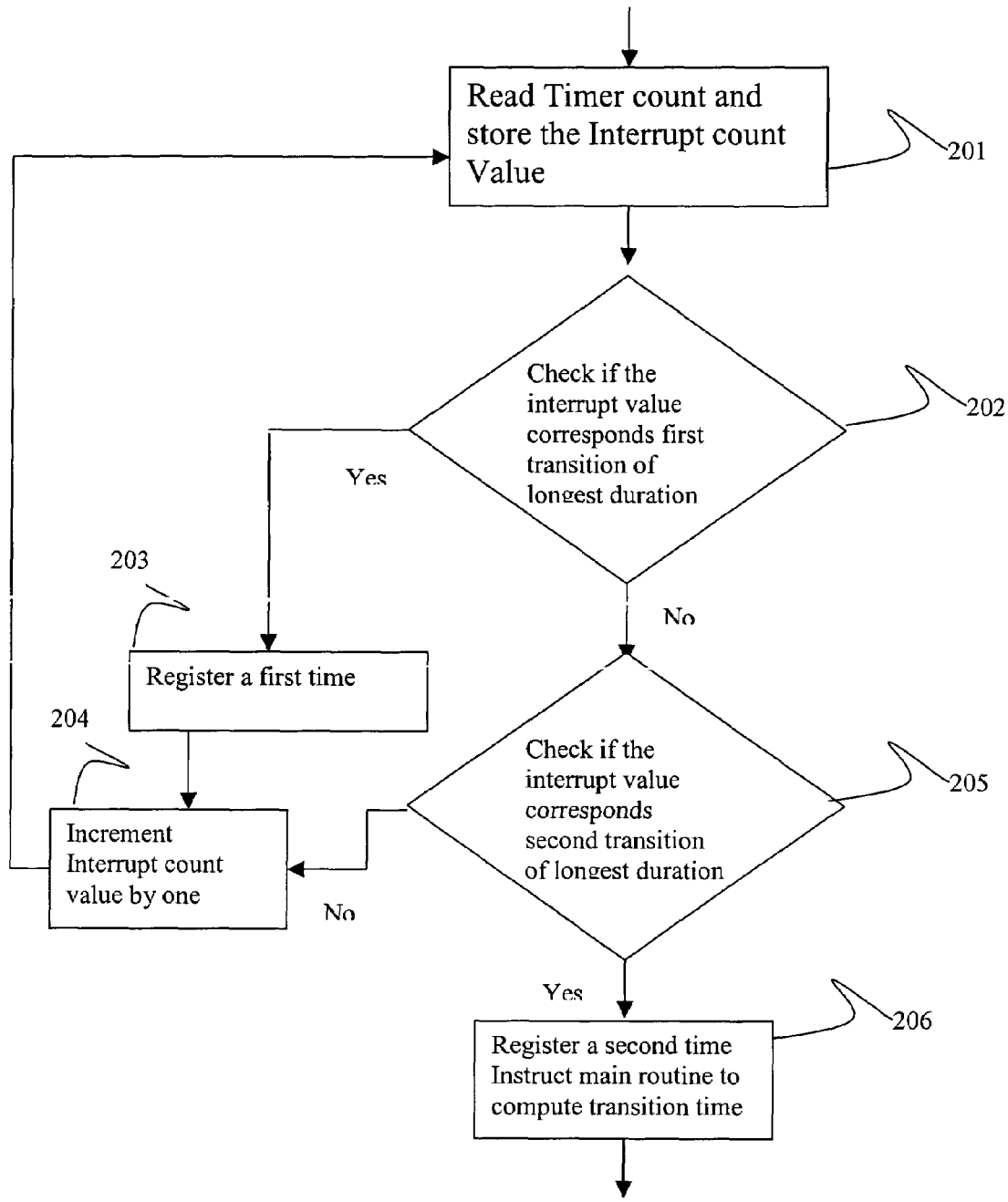
FIG. 3 shows a detailed flow diagram for registering time between two transitions with the longest duration.

FIG. 3 shows a detailed flow diagram for registering time between two transitions of longest duration. For registering time, the PIO sets at 201 a number to each interrupt generated. In the second step 202, it is checked if the interrupt count corresponds to a first transition of longest duration and, if so, then a first time is registered at 203 and the interrupt value is incremented by one at 204 and the signal is again sent to the PIO at step 201 to detect another transition. If the first condition fails at 202, then it is checked if the interrupt counter value corresponds to the second transition of the longest duration part. If yes, then a second time is registered at 206, and instructions are sent to the main routine to determine the transition time and the corresponding baud rate from a table.

In general, the invention can be thought of as providing a microcomputer system or microcontroller with embedded software for automatically detecting a baud rate of an asynchronous serial bit stream received from a transmitter during an initial start up phase. The system includes an interrupt generator triggered by two consecutive bit transitions in the received bit stream. A timer in the system is triggered by the interrupt generator to measure a time interval between the bit transitions. A look up table is provided in the system that defines baud rates for a set of time intervals and the table is accessible to allow comparison of the measured time interval to the set of time intervals to determine a nearest baud rate. The bit stream typically includes a known data set including a synchronizing character, such as the "ENTER" ASCII character. A predefined pair of bit transitions corresponding to the longest duration or largest time interval is used in some embodiments for the measured time interval to more accurately determine the baud rate. The start bit is often excluded by the system from the bit transitions to further enhance accuracy of the system.

The preferred embodiments of the invention having thus being described, it will be readily apparent to one of ordinary skill in the art that many alterations, additions, and modifications to the embodiments of the invention may be made while still encompassing the spirit and scope of the present invention. Any and all such alterations, additions, and modifications are thus intended to be encompassed by the invention as claimed.

We claim:

1. A system for automatically detecting at a microcontroller a baud rate of an asynchronous serial bit stream during an initial setup phase comprising:
   a transmitter;
   a predefined data set received at the microcontroller from the transmitter,
   wherein the microcontroller is capable of executing instructions embodied as software; and
   a plurality of software portions,
   wherein one of said software portions is configured as a transition detector for identifying bit transitions in the predefined data set, said transition detector generating an interrupt when an input signal differs from a compare register bit value and toggling the compare register bit value upon said generating, and another one of said plurality of software portions is configured as a timer triggered by said transition detector measuring a time interval between two predefined bit transitions, a storage element associated with said microcontroller for registering the measured time interval, and a look up table accessible by said microcontroller for determining a nearest baud rate value corresponding to the registered time interval.

2. The system of claim 1, wherein the predefined data set is the "ENTER" character of the ASCII code.

3. The system of claim 1, wherein the predefined bit transitions define a measured time interval having the longest duration between two of the identified bit transitions.

4. The system of claim 1, wherein the predefined bit transitions exclude a start bit.

5. A microcomputer system for automatically detecting a baud rate of an asynchronous serial bit stream received from a transmitter during an initial startup phase, comprising:
   a microcomputer capable of executing instructions embodied as software; and
   a plurality of software portions,
   wherein one of said software portions is configured as
      an interrupt generator triggered when an input signal at an I/O port differs from a compare register bit value, and by two consecutive bit transitions of the received bit stream,
   and another one of said plurality of software portions is configured as
      a timer triggered by the interrupt generator said timer measuring a time interval between the bit transitions, and
      a look up table accessible by the microcomputer defining baud rates for a set of time intervals, wherein the table is accessed by the microcomputer to compare the measured time interval to the set of time intervals to determine a nearest baud rate corresponding to said measured time interval.

6. The microcomputer system of claim 5, wherein the received bit stream includes a predefined data set comprising an "ENTER"character of the ASCII code.

7. The microcomputer system of claim 5, wherein said predefined bit transitions correspond to the longest duration between bit transitions.

8. A microcomputer system as claimed in claim 5 wherein the bit transitions exclude the start bit.

9. A method implemented by a single microcomputer capable of executing instructions embodied as software for automatically detecting a baud rate of a bit stream during, comprising:
   receiving at said single microcomputer a bit stream comprising a data set,
   comparing the bit stream to a compare bit register value and generating an interrupt when said bit stream differs from said compare bit register value;
   measuring a time interval between two bit transitions in the data set, and
   selecting a nearest baud rate corresponding to the measured time interval from a look-up table.

10. The method of claim 9, wherein the data set comprises the "ENTER" character of the ASCII code.

11. The method of claim 9, wherein the bit transitions correspond to a longest duration transition interval in the bit stream.

12. The method of claim 9, wherein the bit transitions exclude an initial bit transition corresponding to a start bit.

13. A computer readable medium tangibly embodying a program of instructions executable by a microcontroller wherein said program of instruction comprises a plurality of program codes for automatic baud rate detection, said program of instruction comprising:

computer readable program code for configuring the microcontroller to toggle a compare register bit value on interrupts generated when an input signal differs from the compare register bit value, whereby interrupts are edge triggered;

computer readable program code for configuring the microcontroller to initialise a timer counter to count a time period between two interrupts;

computer readable program code for configuring the microcontroller to receive a known data set from a transmitter;

computer readable program code for configuring the microcontroller to detect transition timings corresponding to a predetermined part of the data set to compute a transition time between two transitions indicated by the interrupts; and computer readable program code for configuring the microcontroller to select a baud rate corresponding to the transition time for use in configuring the microcontroller.

14. The computer readable medium of claim 13, wherein the two transitions are selected to have a longest duration of pairs of transitions in the known data set.

15. The computer readable medium of claim 13, wherein the known data set includes a synchronizing character from the transmitter.

16. The computer readable medium of claim 15, wherein the synchronizing character is the "ENTER" character of the ASCII code.

17. The A computer readable medium tangibly embodying a program of instructions executable by a microcontroller wherein said program of instruction comprises a plurality of program codes for automatic baud rate detection, said program of instruction comprising:

computer readable program code for configuring the microcontroller to set an I/O port of the microcontroller to a compare mode to generate an interrupt when an input signal differs from a compare register bit value and to toggle the compare register bit value on interrupts generated by the I/O port, whereby interrupts are edge triggered;

computer readable program code for configuring the microcontroller to initialise a timer counter to count a time period between two interrupts;

computer readable program code for configuring the microcontroller to receive a known data set from a transmitter;

computer readable program code for configuring the microcontroller to detect transition timings corresponding to a predetermined part of the data set to compute a transition time between two transitions indicated by the interrupts; and computer readable program code for configuring the microcontroller to select a baud rate corresponding to the transition time for use in configuring the microcontroller.

* * * * *